Patented Jan. 23, 1951

2,539,188

UNITED STATES PATENT OFFICE 2,539,188

SULFOCHLOROHYDROCARBONS AND METHOD FOR MAKING THEM

Bernard W. Gamson and Robert H. Elkins, Chicago, Ill., assignors to Great Lakes Carbon Corporation, Morton Grove, Ill., a corporation of Delaware No Drawing. Application May 25, 1948, Serial No. 29,197

13 Claims. (Cl. 260—139)

Our invention relates to solid infusible, amorphous compositions of the halogens combined with carbon, hydrogen and sulfur and to the mode of preparation thereof.

An object of this invention is to produce substances in which the carbon exists in a reactive form in chemical combination with hydrogen, halogen and sulfur and is suitable for the synthesis of carbon tetrafluoride and other fluoro carbons.

Another object is to produce solid amorphous reactive compounding agents useful in finely divided form in natural and synthetic rubber formulations, plastic or resinous compositions, especially in the chlorinated varieties, as an aid to the vulcanization and reinforcement thereof.

Still another object is the use of these substances in the preparation of solid adsorbents by activation, for example, with steam, sulfur, carbon dioxide, and the like.

The compositions of this invention are chemical combinations of carbon, sulfur, hydrogen and halogen. They are hard, black, insoluble, infusible, dense, generally non-pourous, and are amorphous. The range of composition is as follows:

| | Per cent |
|---|---|
| Carbon | 50–90 |
| Hydrogen | 3– 0.1 |
| Halogen | 25– 1.5 |
| Sulfur | 25– 5.0 |

In addition there may be incidental proportions of ash, as well as very low percentages of oxygen and nitrogen, probably in combined form. The real density may vary from about 1.4 to 1.9.

The compositions of this invention may further be classified into two groups for the purpose of characterizing and defining them, and to indicate in a general way their relationship to the raw materials from which they are derived. Those in group 1 are termed "chlorosulfohydrocarbon," and those in group 2 are termed "chlorosulfocarbon." These substances are greyish to black infusible solids which have chemical compositions in the percentage ranges shown for each group in Table I.

TABLE I

| | Group 1 | Group 2 |
|---|---|---|
| | Per Cent | Per Cent |
| Carbon | 50–65 | 65–90 |
| Hydrogen | 3–1 | 1–0.1 or less |
| Sulfur | 25–15 | 15–5 |
| Chlorine | 25–15 | 15–1.5 |
| Ash | 0.0 to 3.0 | |

*Includes any oxygen and/or nitrogen in chemical combination.

The raw materials which are chlorinated in the practice of our invention constitute the sulfohydrocarbons and the sulfocarbons which are described in the co-pending application of Bernard W. Gamson, Ser. No. 649,730, filed February 23, 1946, now U. S. Patent No. 2,447,004, issued August 17, 1948.

The sulfocarbons are produced by reacting sulfur with specific liquefiable hydrocarbons at a temperature of about 450° to about 625° F. to form a solid infusible mass. The sulfocarbons result when the sulfohydrocarbons are calcined at a temperature of 1100° F. to 1800° F. Both types of the products are greyish to black infusible solids which have chemical compositions in the percentage ranges shown for each in Table II.

TABLE II

| | Sulfohydrocarbon | Sulfocarbon |
|---|---|---|
| | Per Cent | Per Cent |
| Carbon | 47–70 | 70–93 |
| Hydrogen | 4.0–1.8 | 1.8–0.3 |
| Sulfur | 50–25 | 25–6 |
| Ash | Negligible to 2.5 | |

The halogenation of the sulfohydrocarbon to produce the compositions of the present invention is accomplished, preferably by the direct action of substantially pure gaseous halogen, such as chlorine, bromine, iodine or fluorine, at a temperature within the range of 100° F. to 1100° F. For the best results the temperatures are in the range of about 300° F. to about 1000° F. Generally, the sulfohydrocarbons are the more easily halogenated at the lower temperatures than the sulfocarbons. The choice of temperature is dependent upon the degree of halogenation desired as well as the character desired of the finished product.

The sulfocarbons are generally halogenated at a temperature in the range of 300° to about 1800° F. and usually not above 1500° F.

Other chlorinating agents may be used in place of chlorine, such as the sulfur chlorides, thionyl chloride, nitrosyl chloride and the like. The corresponding iodine, bromine and fluorine compounds may be used. Their use, however, is limited by the temperature at which competing reactions occur involving the loss of carbon as volatile products; the maximum temperature for usefulness is about 1100° F. or less when using such agents.

Atmospheric pressure usually suffices for the halogenating reaction, although pressures somewhat greater may be employed to reduce the time of treatment or to lower somewhat the temperature otherwise required.

The course of the chlorination reaction involves both dehydrogenation and desulfurization, each depending to a degree on the starting material and temperature employed. The volatile products comprise hydrogen chloride, sulfur chlorides predominantly sulfur monochloride and some unreacted chlorine. There is substantially no loss of carbon in the presence of chlorine to form volatile products at temperatures below about 1200° F. It is apparent, of course, that useful by-products may be recovered from the gaseous effluent and that unreacted chlorine may be separated and recycled.

The above remarks on the course of the chlorination reaction apply more particularly to the treatment of the sulfocarbons. In the case of the sulfo-hydrocarbons, the chlorination thereof above their temperatures of initial formation (625° F. or less) is accompanied to some extent by a thermal reaction evolving hydrogen sulfide for the most part. Such hydrogen sulfide is further reactive with the chlorine to form hydrogen chloride and sulfur monochloride but such reaction products have not been observed to be detrimental to the solid chlorinated product since the gaseous products are swept out of the reaction zone by the incoming chlorine feed almost immediately after formation.

The chlorosulfohydrocarbons of the group 1 classification usually result from the chlorination of sulfohydrocarbons at temperatures up to, say, about 800° F. The chlorosulfocarbons of the Group 2 classification, on the other hand, may be produced in at least two different ways. First, by chlorinating a sulfocarbon at any temperature selected in the preferred range of 300° F. to 1500° F. Second, by chlorinating a sulfohydrocarbon above its temperature of initial formation (up to 625° F.), preferably at about 700° F. to 1500° F. To form the sulfochlorocarbons or their corresponding halogen counterparts in the second manner described, the operation should either take place at 1100° F. or above, or, if below 1100° F., be followed by a heating step at a higher temperature in the indicated range.

Heat-soaking for several hours of the various chlorinated products at the temperature of formation in an inert atmosphere such as nitrogen, or simply in the presence of gases evolved from the reaction itself, may be employed to alter the composition somewhat. The carbon and chlorine are substantially unaffected; some hydrogen sulfide may be evolved, especially when using the sulfohydrocarbon type of starting material.

The compositions of Group 1 are further distinguished from those of group 2 in that they tend to be unstable at the temperatures of formation of the latter, say, above about 900° F. This instability is indicated by the evolution of part of the chlorine at the elevated temperatures.

A specific example of this invention consists in placing a 6-10 mesh (Tyler Standard Screen) granular packed bed of the solid charge within a one to three inch diameter heated tube maintainable at a constant temperature by an external heating furnace, purging with nitrogen, and then passing chlorine or other halogen gas through the bed at substantially atmospheric pressure at the desired temperature. When the degree of chlorination desired has been obtained, the flow of chlorine is stopped and the bed is purged with nitrogen, cooled and discharged. Prior to cooling and discharging, the product may be heat-soaked at the temperature of formation or a higher temperature for a further period of time, depending on the composition of the end-product desired.

As an alternative embodiment, a more finely crushed charge may be treated with chlorine in a suitable system wherein the gaseous halogen as well as the gaseous or vaporized reaction products maintains the solid particles in an ebulient state generally referred to as "fluidized." Heat-soaking at the temperature of chlorination to somewhat higher temperatures may be conducted by replacing the chlorine or other halogen with an unreactive flowing gas such as nitrogen.

Having now defined and described the compositions characterized as chlorosulfohydrocarbons and chlorosulfocarbons and the manner by which they may be produced, examples are given below to illustrate more fully the nature of our invention, but not to limit the invention to the exact embodiments shown.

EXAMPLE I

*The chlorosulfohydrocarbons*

Sulfohydrocarbons were produced by forming a uniform mixture of a petroleum pitch (8.5% combined hydrogen) with an amount of sulfur stoichiometrically equivalent to its hydrogen content. The mixture was heated to 625° F. and the resulting solid crushed to 6-10 mesh to form a solid infusible amorphous mass of the composition shown in Table III. Gaseous chlorine was passed over granules of the sulfo-hydrocarbons thus formed under various indicated conditions at atmospheric pressure. The charge was contained in a silica tube heated by an electric furnace, the bed purged with nitrogen. It was heated to temperature, and chlorine passed therethrough to the desired degree of reaction, then purged with nitrogen, cooled to room temperature, and the product discharged. Table III shows the composition of the raw materials. Table IV shows the various conditions for the chlorination of each sample of raw material and the composition of the product which resulted. Analyses are given calculated to an ash-free basis. In these runs substantially all of the carbon was recovered in the product. The resulting products are examples of the chlorosulfohydrocarbon compositions.

TABLE III

*Composition of the sulfohydrocarbon raw materials*

| Run No.[1] | 1 | 2 | 3 |
|---|---|---|---|
|  | Per cent | Per cent | Per cent |
| Carbon | 56.5 | 59.7 | 66.3 |
| Hydrogen | 2.7 | 2.5 | 1.9 |
| Sulfur | 40.8 | 37.8 | 31.8 |

[1] Numbers correspond to the run numbers given in Table IV.

TABLE IV

*Chlorination conditions and products*

| Run No. | Chlorination ||| Product, per cent composition ||||
|---|---|---|---|---|---|---|---|
|  | Temp., °F. | Ft. 3Cl$_2$ per hr. | Time, Hours | Carbon | Hydrogen | Sulfur | Chlorine |
| 1 | 300 | 1 | 7 | 54.4 | 2.0 | 23.6 | 20.0 |
| 2 | 500 | 2 | 9 | 56.3 | 1.7 | 23.6 | 18.4 |
| 3 | 800 | 2 | 5.4 | 61.5 | 1.2 | 18.9 | 18.4 |

NOTE.—Run 1 made on a 400 gram charge in a 3 inch diameter tube. Runs 2 and 3 made on a 50 gram charge in a 1 inch diameter tube.

EXAMPLE II

The chlorosulfocarbons

Sulfocarbons which had been produced by the calcination at 1100–1800° F., of a sulfohydrocarbon made as described above were treated with chlorine under the various conditions indicated in Table VI, in a silica tube furnace in the manner described in Example I. Table V shows the composition of the sulfocarbon raw materials. Table VI shows the conditions for chlorinating each and the composition of the resulting products. These products, containing substantially all of the carbon from the raw materials, are examples of the chlorosulfocarbon compositions. Analyses are given on an ash-free basis.

TABLE V

*Composition of sulfocarbon raw materials*

| Run No.[1] | 4 | 5 | 6 |
|---|---|---|---|
|  | Per cent | Per cent | Per cent |
| Carbon | 73.2 | 83.5 | 92.1 |
| Hydrogen | 1.6 | 1.3 | 0.3 |
| Sulfur | 25.2 | 15.2 | 7.6 |
| Temperature of Calcination °F | 1,100 | 1,400 | 1,800 |

[1] Run Nos. correspond to those in Table VI.

TABLE VI

*Chlorination conditions and products*

| Run No. | Chlorination | | Product, per cent composition | | | |
|---|---|---|---|---|---|---|
|  | Temp., °F. | Ft. 3Cl₂ per hr. | Time, Hours | Carbon | Hydrogen | Sulfur | Chlorine |
| 4 | 1,000 | 2 | 6.4 | 65.9 | 0.9 | 17.6 | 15.6 |
| 5a | 300 | 1 | 7 | 82.5 | 1.0 | 14.7 | 1.8 |
| 5b | 1,400 | 1 | 7 | 74.4 | 0.1 | 9.9 | 15.6 |
| 6 | 1,800 | 2 | 1 | 87.3 | 0.2 | 5.4 | 7.1 |

NOTE.—Runs 5a and b made on a 400 gram charge in a 3 inch diameter tube. Runs 4 and 6 made on a 50 gram charge in a 1 inch diameter tube.

EXAMPLE III

Calcining a chlorosulfohydrocarbon

A sulfohydrocarbon amounting to 400 grams which had been produced by heating petroleum pitch and sulfur stoichiometrically equivalent to the hydrogen content at 500° F., was crushed to 6–10 mesh granules and chlorinated with chlorine gas at 400° F. and atmospheric pressure. The chlorosulfohydrocarbon product was then calcined in a nitrogen atmosphere for one-half hour at 1400° F., resulting in the removal of chlorine as well as substantial amounts of sulfur and hydrogen. The analyses (ash-free basis) of the raw material and products therefrom are shown in Table VII.

TABLE VII

|  | Raw Material 500° F. Sulfohydrocarbon | Chlorosulfohydrocarbon | |
|---|---|---|---|
|  |  | From chlorination at 400° F. | Calcined ½ hr. at 1400° F. |
|  | Per cent | Per cent | Per cent |
| Carbon | 53.8 | 53.2 | 85.6 |
| Hydrogen | 2.7 | 1.6 | .72 |
| Sulfur | 43.5 | 34.6 | 13.7 |
| Chlorine |  | 10.6 | 0 |

The chlorinated product contained all of the carbon present in the raw material and after its calcination approximately 97.5% of the carbon remained in the chlorine-free product. The composition is more reactive to produce carbon disulfide by treatment with sulfur vapor at 1200–1800° F., than the parent material. It exhibits absorptive properties which is increased by treating with steam at 1000–1600° F.

EXAMPLE IV

Sulfurmonochloride as the chlorinating agent

A sulfocarbon which had been prepared at a calcination temperature of 1400° F. was crushed to 6–10 mesh granules and 100 grams were charged into a one-inch diameter silica tube furnace at 1400° F. to form a packed bed. After purging with nitrogen sulfurmonochloride was dripped slowly through the charge for two hours; the outlet was at atmospheric pressure. A chlorosulfocarbon product was obtained. Analyses (ash-free basis) of the raw material and chlorinated product therefrom are shown in Table VIII.

TABLE VIII

|  | Raw Material | Chlorosulfocarbon |
|---|---|---|
|  | Per cent | Per cent |
| Carbon | 89.0 | 76.6 |
| Hydrogen | 1.0 | 0.1 |
| Sulfur | 10.0 | 10.9 |
| Chlorine | 0 | 12.4 |

The chlorosulfocarbon products of runs 5a and b in Example II were subjected to X-ray diffraction analyses which confirmed substantially the state of chemical union between the elements of the composition.

In the diffraction pattern for the chlorosulfocarbon prepared at 1400° F. (5b), faint diffuse rings were observed for a graphite structure at 3.8 and 2.1 Angstroms. Another diffuse ring was found at 10 Angstroms for combined sulfur; crystalline sulfur was absent. Traces of several lines characteristics for compounds of chlorine were observed.

The diffraction pattern for the chlorosulfocarbon prepared at 300° F. (run 5a) showed an identical pattern, except that the graphite structure was less marked.

In either case, however, the samples were found to be highly amorphous.

EXAMPLE V

When substituting bromine, iodine or fluorine for the chlorine used in examples, compositions containing 50–65% carbon; 15–22% sulfur; 1–2% hydrogen and 16–21% halogen are obtained.

EXAMPLE VI

In a like manner, substitution of bromine, iodine or fluorine for chlorine in runs as in Example II, the carbon content of the resulting compositions is 70–90%; hydrogen 0.5 to 1%; sulfur 5–15%; and halogen 2–12%.

The compositions of Examples V and VI are convertible to the corresponding carbon tetrahalides.

By passing mixed sulfur and chlorine vapors over the compositions above described, sulfur monochloride, carbon tetrachloride and carbon disulfide are obtained. Temperatures used are 1100–1800° F. preferably, 1200–1600° F. The carbon is eventually completely consumed. Similar effects are obtained with the other halogen compounds.

We claim as our invention:

1. A process which comprises heating an amorphous solid infusible insoluble sulfohydrocarbon to a temperature of about 100–1100° F. and continuously passing a halogen over the compound thereby forming a solid infusible insoluble amorphous composition of carbon, hydrogen, sulphur and halogen in chemical combination.

2. A process which comprises heating an amorphous solid infusible insoluble sulfocarbon to a temperature of about 300–1800° F. and continuously passing a halogen over the compound thereby forming a solid infusible insoluble amorphous composition of carbon, hydrogen, sulfur, halogen and hydrogen in chemical combination.

3. A process which comprises heating an amorphous solid infusible insoluble sulfocarbon to a temperature of about 300–1500° F. and continuously passing a halogen over the compound thereby forming a solid infusible insoluble amorphous composition of carbon, hydrogen, sulfur and halogen in chemical combination.

4. A solid, dense, infusible, insoluble, amorphous composition consisting of carbon 50–90%; hydrogen 0.1–3%; sulfur 5–25%; and halogen 1.5–25% all in chemical combination.

5. The composition of claim 4 wherein the halogen is chlorine.

6. The composition of claim 4 wherein the halogen is bromine.

7. A solid, dense, infusible, insoluble, amorphous composition consisting of carbon 50–65%; hydrogen 1–3%; sulfur 15–25%; and halogen 15–25% all in chemical combination.

8. The composition of claim 7 wherein the halogen is chlorine.

9. A solid, dense, infusible, insoluble, amorphous composition consisting of carbon 65–90%; hydrogen 0.1–1.0%; chlorine 5–15% and halogen 1.5% to 15% all in chemical combination.

10. The composition of claim 9 wherein the halogen is chlorine.

11. A composition comprising a dense, infusible, insoluble, amorphous solid consisting of carbon 50–90%; hydrogen 0.1–3%; sulfur 5–25%; and halogen 1.5–25%, all in chemical combination.

12. The composition of claim 11 wherein the halogen is chlorine.

13. A process which comprises heating a solid, infusible, insoluble amorphous composition consisting essentially of:

|  | Per cent |
|---|---|
| Carbon | 47–93 |
| Hydrogen | 4–0.3 |
| Sulfur | 50–6 | all in chemical combination, with chlorine at a temperature of 100–1800° F. to produce an infusible, insoluble amorphous solid having the composition:

|  | Per cent |
|---|---|
| Carbon | 50–90 |
| Hydrogen | 3–0.1 |
| Chlorine | 25–1.5 |
| Sulfur | 25–5 | all in chemical combination.

BERNARD W. GAMSON.
ROBERT H. ELKINS.

REFERENCES CITED

The following references are of record in the file of this patent:

UNITED STATES PATENTS

| Number | Name | Date |
|---|---|---|
| 2,259,695 | Hull | Oct. 21, 1941 |
| 2,447,004 | Gamson | Aug. 17, 1948 |
| 2,447,005 | Gamson | Aug. 17, 1948 |
| 2,447,006 | Gamson | Aug. 17, 1948 |

FOREIGN PATENTS

| Number | Country | Date |
|---|---|---|
| 468,627 | Great Britain | of 1937 |